Patented Mar. 16, 1943

2,313,993

UNITED STATES PATENT OFFICE 2,313,993

ORGANIC SULPHUR AND SELENIUM COMPOUNDS

Béla Gáspár, Hollywood, Calif., assignor to Chromogen, Incorporated, a corporation of Nevada No Drawing. Application February 3, 1940, Serial No. 317,218. In Great Britain February 4, 1939

12 Claims. (Cl. 260—562)

The present invention relates to the manufacture of new sensitizing dyes and to their employment for sensitizing photographic emulsions. The invention further relates to the manufacture of new thiazole and selenazole compounds, which can be used in building up the new sensitizing dyes. In addition, the invention provides a new general method of preparing thio-acylamides and seleno-acylamides, by which method also the particular thio-acylamides and seleno-acylamides to be used for the preparation of the above mentioned thiazoles and selenazoles are obtainable.

It has been found that quaternary salts of mono- or bis-thiazoles and quaternary mono- or bis-selenazoles derived from diphenyl or from substituted diphenyls can be transformed into carbocyanine dyes having sensitizing properties by condensation with an alkyl ester of an ortho-carboxylic acid, for example with ethylorthoformate or its derivatives. For the manufacture of carbocyanine dyes with longer methine chains, the ethylorthoformate may be replaced by the compounds usually employed in the manufacture of polymethine dyes.

The thiazole and selenazole compounds required for the manufacture of the new carbocyanine dyes can be prepared in a manner described below from thio-acylamides or seleno-acylamides derived from substituted or non-substituted aminodiphenyls or diaminodiphenyls, such as 4-aminodiphenyl, benzidine or o-dianisidine. The thio-acylamides and seleno-acylamides above referred to are obtainable by a new method which has been found to be useful for replacing oxygen in acyl-amino compounds by sulphur or selenium.

EXAMPLE 1

(a) PREPARATION OF DITHIO-ACETYLBENZIDINE

Dithio-acetylbenzidine is prepared from .05 mol of diacetylbenzidine and .05 mol of phosphorus pentasulphide by heating them for 8 hours at 110° C. in the presence of 100 ccs. of dry pyridine and while stirring. The solution, decanted from a small residue, is diluted with 200 ccs. of 2-normal sodium hydroxide solution and 400 ccs. water, heated for about 15 minutes and filtered. Thereafter, 2-normal hydrochloric acid is added until there is no more precipitation to be observed. The raw product is purified by being recrystallized from methyl alcohol.

The purified compound has a melting point of 251 to 253° C.

(b) PREPARATION OF A DIBENZOTHIAZOLYL COMPOUND 2 gms. of N.N'-dithioacetyl-benzidine (melting point 251 to 253° C.) are dissolved in 130 ccs. of 2-normal caustic soda solution and the whole is slowly poured into 100 ccs. of a 20% potassium ferricyanide solution. A yellowish-brown flocculent precipitate is formed. After 24 hours, the precipitate is filtered off and washed first with dilute caustic soda solution and then with water. Thereafter, the precipitate is dried and purified, if required. If not washed sufficiently, the precipitate may turn brown on drying. But in this case, it can be dissolved in a boiling mixture of about equal parts of o-dichlorobenzene and glacial acetic acid. The solution is filtered off from the undissolved impurities, cooled, and then 10 ccs. of petrol ether are added. The further impurities thus deposited are filtered off and the gltrate is poured into water. A light-yellow precipitate is thus obtained, which is believed to be 2.2'-dimethyl-dibenzothiazolyl-6.6' of the following formula:

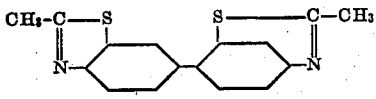

Its melting point is 173° C.

(c) PREPARATION OF DYES

*I. Carbocyanine dyes*

1 gram of the 2.2'-dimethyl-dibenzothiazolyl-6.6' is melted for 10 hours at 110 to 120° C. with 1.6 gms. of p-toluene-ethylsulphonate. The melt is freed of impurities by extraction first with hot benzene and then with hot acetone and the remaining product is then dissolved either in 20 ccs. acetic anhydride or in 50 ccs. of dry pyridine. To the solution of the quaternary salt thus obtained is added 1 cc. of ethyl orthoformate. The whole is then boiled for 20 or 60 minutes, respectively, under reflux. The dye thus formed is precipitated from the acetic anhydride solution by ether, washed with ether and water, dissolved in methyl alcohol and precipitated by a hot 10% solution of potassium bromide. The dye shows an absorption maximum at 580μμ and is believed to correspond to the formula:

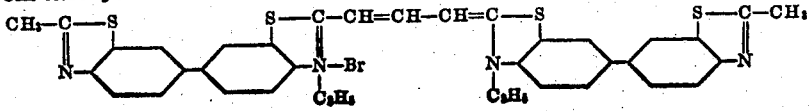

From the pyridine solution the dye may be precipitated by water.

II. Thio-pseudocyanine dyes 0.5 gm. of the 2.2'-dimethyl-dibenzothiazolyl-6.6' is melted with 0.8 gm. of p-toluene-ethylsulphonate for about 10 hours at 110 to 120° C. The melt after having been extracted with hot benzene and then with hot acetone is dissolved in 3 ccs. pyridine and heated with 0.32 gm. of N-methyl-thioquinoline methiodide to about 120° C. for 45 minutes. Crystals of dye are obtained by keeping the mixture at 0° C. for several hours. The dye is washed with ether. Its maximum absorption is at about 500μμ and it is believed to correspond to the following formula:

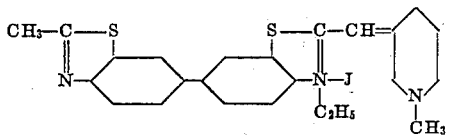

III. Polymethine dyes

The N.N'-diethyl toluene sulphonate of the dimethyl-dibenzothiazolyl-6,6' is prepared as above and 1 gram therereof and 0.3 gms. of glutacone dialdehyde dianilide are dissolved by heating in 4 ccs. absolute alcohol. 2 ccs. piperidine and a few drops of diethylamine are added to the solution at room temperature. The solution is allowed to stand for about five days during which time it takes on a bluegreen color. 2 ccs. of a 10% potassium iodide solution are added. The solution is kept in ice water for about two hours and the precipitated dye is filtered, washed with water and dried. It is a powder of metallic lustre which forms a blue solution in methyl alcohol. The product is believed to correspond to the formula:

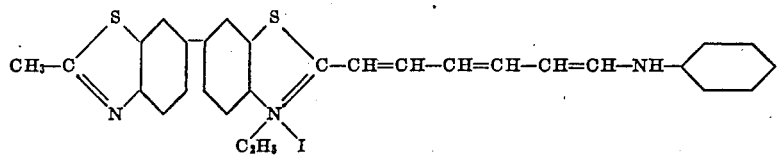

The solution from which the dye has been filtered still contains the hepta-methine-dye which can be precipitated by adding 5 ccs. of a 10% sodium perchlorate solution. The precipitated dye is in micro-crystalline form, and its solution in methyl alcohol is of yellowish green color. It probably corresponds to the formula:

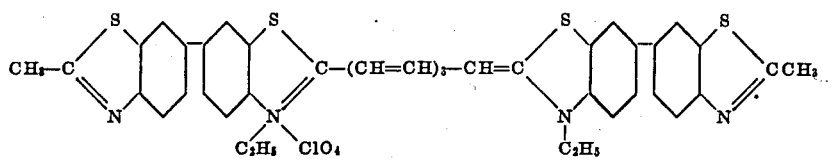

EXAMPLE 2

(a) PREPARATION OF DI-THIOACETYL-O-DIANISIDINE

A suspension of .05 mol diacetyl-o-dianisidine and .025 mol of phosphorus penta-sulphide in 100 ccs. of dry pyridine is stirred at 110° C. for about 9 hours. The raw product is dissolved in diluted sodium hydroxide solution and precipitated with 2-normal hydrochloric acid. The precipitate is dissolved again in sodium hydroxide solution and precipitated by carbon dioxide.

(b) PREPARATION OF A DI-BENZOTHIAZOLYL COMPOUND 2 gms. of the di-thioacetyl-o-dianisidine, dissolved in 150 ccs. of 2-normal sodium hydroxide solution, are poured into 250 ccs. of a 20% potassium-ferricyanide solution and the mixture is allowed to stand for about 24 hours. The precipitate formed is filtered off, thoroughly washed, dried and pulverised and extracted with 250 ccs. of hot benzene. On addition of ether to the benzene solution a yellow powder is precipitated (melting point 159° C.), which is believed to be the 2.2'-dimethyl-4.4'-di-methoxydibenzothiazolyl-6.6'.

(c) PREPARATION OF A DYE 1 gram of the di-benzo-thiazolyl compound thus obtained and 1.3 gms. p-toluene-ethylsulphonate are heated at about 120° C. for 12 hours and thereafter the whole is dissolved in 5 ccs. of pyridine. 2 ccs. of triethyl-ortho-formate are added and the whole is heated to 120° C. for about 90 minutes. The dye is precipitated by the addition of ether, filtered off and washed with ether. It is dissolved in methyl alcohol and precipitated with water. Its absorption has a maximum at 580μμ.

The method used for preparing the di-thioacetylbenzidine—Example 1a—and the di-thioacetyl-o-dianisidine—Example 2a—can also be used for preparing other thio-acylamides.

Thioacylamides derived from aliphatic, aromatic or heterocyclic amino-compounds or such acids may be prepared by the same method and compounds that cannot be produced satisfactorily by known methods are easily obtainable by the process.

Thioacylamides have hitherto been manufactured by fusing acylamides with phosphorus penta-sulphide or by heating these substances in the presence of indifferent diluents, such as benzol, toluol or xylol. The yield obtained by employing the latter method is, however, unsatisfactory in most cases, especially in such cases where the acylamide and the phosphorus penta-sulphide are but partially or not at all soluble in the diluents and can be increased by the addition of small amounts of pyridine.

It has now been found that thioacylamides may be obtained from acylamides and phosphorus penta-sulphide in a simple process of reaction and with a good yield, if, instead of the neutral diluents hitherto employed, use is made of basic organic diluents, for example pyridine, aniline, monomethyl-aniline, dimethyl-aniline or quinoline. These bases are good solvents for the cyclic acylamides; they dissolve phosphorus penta-sulphide with the development of great heat. It may be assumed that the addition products or compounds thus formed, perhaps thiophosphate, causes the replacement of the oxygen in the acylamides, and that the straightforward progress of the reaction is to be attributed to these intermediate products. In the case of water-soluble organic bases these may be extracted from the raw product containing the thio-acylamide by water; in the cases of water-insoluble bases the extraction is effected with diluted acids.

The most suitable substances for the reaction are acylamides that are derived from an aromatic or heterocyclic amine with one or more nuclei and that may have any desired substituents. Thus the following compounds may be prepared:

1-Thioacetnaphthalide

.05 mol acetylnaphthylamine is thoroughly mixed with .025 mol of phosphorus penta-sulphide in powdered form and then 50 ccs. of dry pyridine are added. The mixture becomes hot and is constantly stirred for 7 hours at 100° C. After the solution has been decanted off from the small residue, 200 ccs. of 2-normal sodium hydroxide solution are added and the whole is diluted with 400 ccs. of water. This solution is then warmed for about 15 minutes on a water bath and 2-normal hydrochloric acid is added until there is no more precipitation to be observed. The raw product is purified by re-crystallizing from glacial acetic acid.

Thioacetyl compound of 4-iodo-1-amino-naphthalene

.05 mol of the acetyl compound of 4-iodo-1-naphthylamine is thoroughly mixed with .025 mol of phosphorus penta-sulphide in powder form and then 100 ccs. of dry pyridine are added. The whole becomes hot and is stirred for five hours at 100° C. The solution is then treated as described in connection with the preparation of thioacetnaphthalide until the precipitate is obtained and this is filtered off, again dissolved in 2-normal sodium hydroxide solution and again precipitated with 2-normal hydrochloric acid, the precipitate is sucked off and then thoroughly washed with water.

Thioacetyl compound of 4-bromo-1-aminonaphthalene

This compound is manufactured from the acetyl compound of 4-bromo-1-aminonaphthalene in exactly the same manner as described in connection with the preparation of thioacetnaphthalide with the exception that the time is 13 hours and the temperature is 110° to 120° C. The raw product may be purified by being re-crystallized from methyl alcohol. The purified compound has a melting point of 120° C.

Di-thioacetyl-p-phenylene-diamine

This compound is prepared from .05 mol diacetyl-p-phenylene-diamine and .1 mol phosphorus penta-sulphide in the presence of 75 ccs. dry pyridine. The process is carried out as described above by heating for 5 hours at 100 to 105° C. The raw product may be re-crystallized from water.

Thioacetyl-dehydro-thiotoluidine

This compound is prepared from .05 mol of acetyldehydrothiotoluidine and .025 mol of phosphorus penta-sulphide in the presence of 50 ccs. of dry pyridine. The process is carried out as described above by heating for 20 hours at 115 to 120° C. The raw product is purified by being re-crystallized from methyl alcohol. The purified compound has a melting point of 204° C.

4-Thioacetylamino-diphenyl

This compound is prepared from .05 mol of 4-acetylamino-diphenyl and .025 mol of phosphorus penta-sulphide, employing the process described in connection with the preparation of the thioacet-naphthalide but heating for 8 hours at 110° C.

The examples given above serve to make clear the nature of the new products and processes of the invention although their recitation should not be taken as limiting the invention since other acylamino compounds and other phosphorus sulphides may be employed with equal success. In place of the acylated aromatic primary amines, the following types of compounds may be employed: acylated secondary aromatic amines, hydroaromatic amines, aliphatic amines or simple acylamides. In place of the acetyl group any other unsubstituted or substituted organic acyl group may be present such as aliphatic, hydroaromatic, aromatic or heterocyclic acyl group. Examples illustrative of such groups are as follows: formyl-, chloracetyl-, propionyl-, butryl-, benzoyl-, nitrobenzoyl-, hexahydrobenzoyl-, and nicotinoyl-groups. Other phosphorus sulphides such as $P_4S_3$ and $P_4S_7$ may be employed in place of the phosphorus penta-sulphide mentioned in the above examples.

In a manner analogous to that described for the production of thioacylamino compounds, the corresponding selenium compounds may be obtained by employing phosphorus penta-selenide instead of phosphorus penta-sulphide. The seleno-acyl-amino compounds may be used for the production of benzoselenazoles quaternary salts and dyes.

What is claimed is:

1. As new intermediate products the compounds of the following general formula

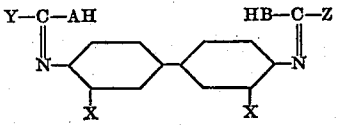

in which A and B stand for a bivalent atom selected from the group consisting of sulphur and selenium, Y and Z stand for alkyl radicals, X stands for groups selected from the group consisting of hydrogen and alkyl-oxy.

2. As new products the di-thioacetyl derivatives of benzidine.

3. As new product the bis-[thioacetylaminophenyl].

4. The process of producing a bis-[thioacetylaminophenyl] compound which comprises heating a bis-[acetaminophenyl] compound with phosphorus penta-sulphide in a liquid consisting mainly of an organic base selected from the group consisting of aromatic amines and nitrogenous heterocyclic bases capable of dissolving phosphorous penta-sulphide with the development of heat.

5. The process of producing a bis-[thioacetylaminophenyl] compound which comprises heating a bis-[acetaminophenyl] compound with phosphorus penta-sulphide in a liquid consisting mainly of pyridine.

6. The process of substituting the oxygen atom of an acylamino compound by an atom selected from the group consisting of sulphur and selenium which comprises heating the acylamino compound with an agent selected from the group consisting of phosphorus sulphides and selenides in a liquid consisting mainly of an organic base selected from the group consisting of aromatic amines and nitrogenous heterocyclic bases capable of dissolving said agent with the development of heat.

7. The process of substituting the oxygen atom of an acylamino compound by an atom selected from the group consisting of sulphur and selenium which comprises heating the acylamino compound with an agent selected from the group consisting of phosphorus sulphides and selenides in a liquid consisting mainly of pyridine.

8. The process of substituting the oxygen atom of an acylamino compound by an atom selected from the group consisting of sulphur and selenium which comprises heating the acylamino compound with an agent selected from the group consisting of phosphorus sulphides and selenides in an organic diluent selected from the group consisting of aromatic amines and nitrogenous heterocyclic bases capable of dissolving said agent with the development of heat.

9. The process of substituting the oxygen atom of an acetamino group by sulphur which comprises heating the acetamino compound with phosphorus penta-sulphide in dry pyridine.

10. The process of substituting the oxygen atom of an acetamino group by sulphur which comprises heating the acetamino compound with phosphorus penta-sulphide in a liquid consisting mainly of pyridine.

11. The process of substituting the oxygen atom of an acetamino group by sulphur which comprises heating the acetamino compound with phosphorus penta-sulphide in a liquid consisting mainly of an organic base selected from the group consisting of aromatic amines and nitrogenous heterocyclic bases capable of dissolving phosphorous penta-sulphide with the development of heat.

12. As a new product the bis-[selenoacetyl-aminophenyl].

BÉLA GÁSPÁR.